US011905856B2

(12) United States Patent
Batscha

(10) Patent No.: US 11,905,856 B2
(45) Date of Patent: Feb. 20, 2024

(54) GEOTHERMAL DISTRICT HEATING POWER SYSTEM

(71) Applicant: ORMAT TECHNOLOGIES, INC., Reno, NV (US)

(72) Inventor: Dan Batscha, Kiryat Ono (IL)

(73) Assignee: Ormat Technologies, Inc., Reno, NV (US)

( * ) Notice: Subject to any disclaimer, the term of this patent is extended or adjusted under 35 U.S.C. 154(b) by 0 days.

(21) Appl. No.: 17/624,282

(22) PCT Filed: Jul. 2, 2020

(86) PCT No.: PCT/IL2020/050736
§ 371 (c)(1),
(2) Date: Dec. 31, 2021

(87) PCT Pub. No.: WO2021/001829
PCT Pub. Date: Jan. 7, 2021

(65) Prior Publication Data
US 2022/0259989 A1   Aug. 18, 2022

Related U.S. Application Data

(60) Provisional application No. 62/870,362, filed on Jul. 3, 2019.

(51) Int. Cl.
| F01K 25/08 | (2006.01) |
| F01K 17/02 | (2006.01) |
| F24D 10/00 | (2022.01) |
| F03G 4/00  | (2006.01) |
| F24T 50/00 | (2018.01) |

(52) U.S. Cl.
CPC .............. *F01K 25/08* (2013.01); *F01K 17/02* (2013.01); *F03G 4/035* (2021.08); *F24D 10/00* (2013.01);
(Continued)

(58) Field of Classification Search
CPC .......... F01K 25/08; F01K 17/02; F01K 11/02; F03G 4/035; F24D 10/00; F24D 2200/11;
(Continued)

(56) References Cited

U.S. PATENT DOCUMENTS 6,536,215 B1 * 3/2003 Vikstrom ................ F01K 17/02
                                                  60/645
2010/0263380 A1 * 10/2010 Biederman ............... F02G 5/04
                                                  60/651
(Continued)

FOREIGN PATENT DOCUMENTS

| CN | 102562496 A | 11/2012 |
| CN | 109296416 A | 1/2019  |

(Continued)

OTHER PUBLICATIONS

Guo, T. et al."Fluids and Parameters Optimization for a Novel Cogeneration System Driven by Low-Temperature Geothermal Sources," Energy, vol. 36(5), pp. 2639-2649, Mar. 2011.
(Continued)

*Primary Examiner* — Hoang M Nguyen
(74) *Attorney, Agent, or Firm* — Fenwick & West LLP

(57) ABSTRACT

A geothermal district heating (DH) system includes a plurality of DH conduits each of the conduits extending to a corresponding heat consumer; means for delivering a DH-usable fluid through said plurality of DH conduits; a fluid circuit through which a geothermal fluid is flowable; and at least two heat exchangers, each of the heat exchangers configured to transfer heat directly or indirectly from the geothermal fluid to said DH-usable fluid with a total heat influx provided by the at least two heat exchangers to said DH-usable fluid that is sufficiently high to raise a temperature of the DH-usable fluid to a predetermined DH-usable
(Continued)

temperature without need for any supplemental fossil fuel derived waste heat to be transferred to said DH-usable fluid.

20 Claims, 4 Drawing Sheets

(52) U.S. Cl.
CPC .......... *F24T 50/00* (2018.05); *F24D 2200/11* (2013.01); *F24D 2200/126* (2013.01)

(58) Field of Classification Search
CPC ...... F24D 2200/126; F24D 3/18; F24T 50/00; Y02B 10/40; Y02B 30/12
USPC .............................. 60/641.2–642.4, 651, 671
See application file for complete search history.

(56) References Cited

U.S. PATENT DOCUMENTS

| | | | |
|---|---|---|---|
| 2012/0216540 A1* | 8/2012 | Stoever | B01D 53/8625 60/670 |
| 2014/0130498 A1* | 5/2014 | Randolph | F03G 4/026 166/267 |
| 2021/0172344 A1* | 6/2021 | Juchymenko | F01K 23/101 |

FOREIGN PATENT DOCUMENTS

| WO | WO 2015/161987 A1 | 10/2015 |
|---|---|---|
| WO | WO 2018/202528 A1 | 11/2018 |

OTHER PUBLICATIONS

PCT International Search Report and Written Opinion, PCT Application No. PCT/IL2020/050736, dated Oct. 1, 2020, 10 pages.
Colmenar-Santos, A., et al., "The geothermal potential is Spain," Renewable and Sustainable Energy Reviews, vol. 56, Dec. 2015, p. 865-886, XP029387099.
Extended European Search Report, European Patent Office Application No. 20835240.1, dated Sep. 25, 2023, 10 pages.

* cited by examiner

GEOTHERMAL DISTRICT HEATING POWER SYSTEM

FIELD OF THE INVENTION

The present invention relates to the field of geothermal energy. More particularly, the invention relates to a geothermal district heating system by which geothermally generated heat is distributed for residential and commercial heating requirements.

BACKGROUND OF THE INVENTION

In a district heating system, a heat resource that would otherwise be wasted is exploited by means of a network of conduits that deliver water heated by the resource to consumers, in order to meet their heat demands, generally in terms of space heating and the production of hot water. The conduits of the district heating system are generally relatively short to minimize the installation costs.

Typical heat resources for a district heating system typically include waste heat from a combined heat and power station, often referred to as a cogeneration plant, waste heat from an industrial process, or a geothermal resource.

Since heating and cooling needs account for about one-half of energy consumption, geothermal district heating has much importance in terms of alleviating energy dependency and reducing carbon dioxide emissions relative to prevalent district heating systems that rely on fossil fuels. There is a large potential for geothermal district heating systems in Europe, for example, as 25% of its population lives in areas that are relatively close to geothermal wells. However, the high costs involved in locating a suitable geothermal production well, drilling the well and connecting the well to the district heating system often outweigh the savings in the use of a geothermal resource, particularly when given fossil fuel derived waste heat has a high enthalpy level even though its temperature is relatively low. Thus geothermal district heating systems have had limited acceptance, and even if a geothermal resource has been used as a source of heat for a district heating system, its heat influx has been supplemented with fossil fuel derived waste heat.

It is an object of the present invention to provide a geothermal district heating system supplying a sufficiently high heat influx to a fluid medium that needs not to be supplemented with fossil fuel derived waste heat.

It is another object of the present invention to provide an economically viable geothermal district heating system.

Other objects and advantages of the invention will become apparent as the description proceeds.

SUMMARY OF THE INVENTION

A geothermal district heating (DH) system comprises a plurality of DH conduits each of said conduits extending to a corresponding heat consumer; means for delivering a DH-usable fluid through said plurality of DH conduits; a fluid circuit through which a geothermal fluid is flowable; and at least two heat exchangers, each of said heat exchangers configured to transfer heat directly or indirectly from said geothermal fluid to said DH-usable fluid with a total heat influx provided by said at least two heat exchangers to said DH-usable fluid that is sufficiently high to raise a temperature of said DH-usable fluid to a predetermined DH-usable temperature without need for any supplemental fossil fuel derived waste heat to be transferred to said DH-usable fluid.

A geothermal cogeneration system comprises a fluid circuit through which a geothermal fluid is flowable; a power-producing section by which an organic motive fluid circulates in an Organic Rankine Cycle (ORC), is vaporized by the geothermal fluid, and is caused to expand in a turbine of the ORC to produce power; and a heat-producing section through which a liquid flows and is heated in a first heat exchanger by discharge of the organic turbine and is additionally heated in a second heat exchanger by heat depleted geothermal fluid.

and

Figure 4:
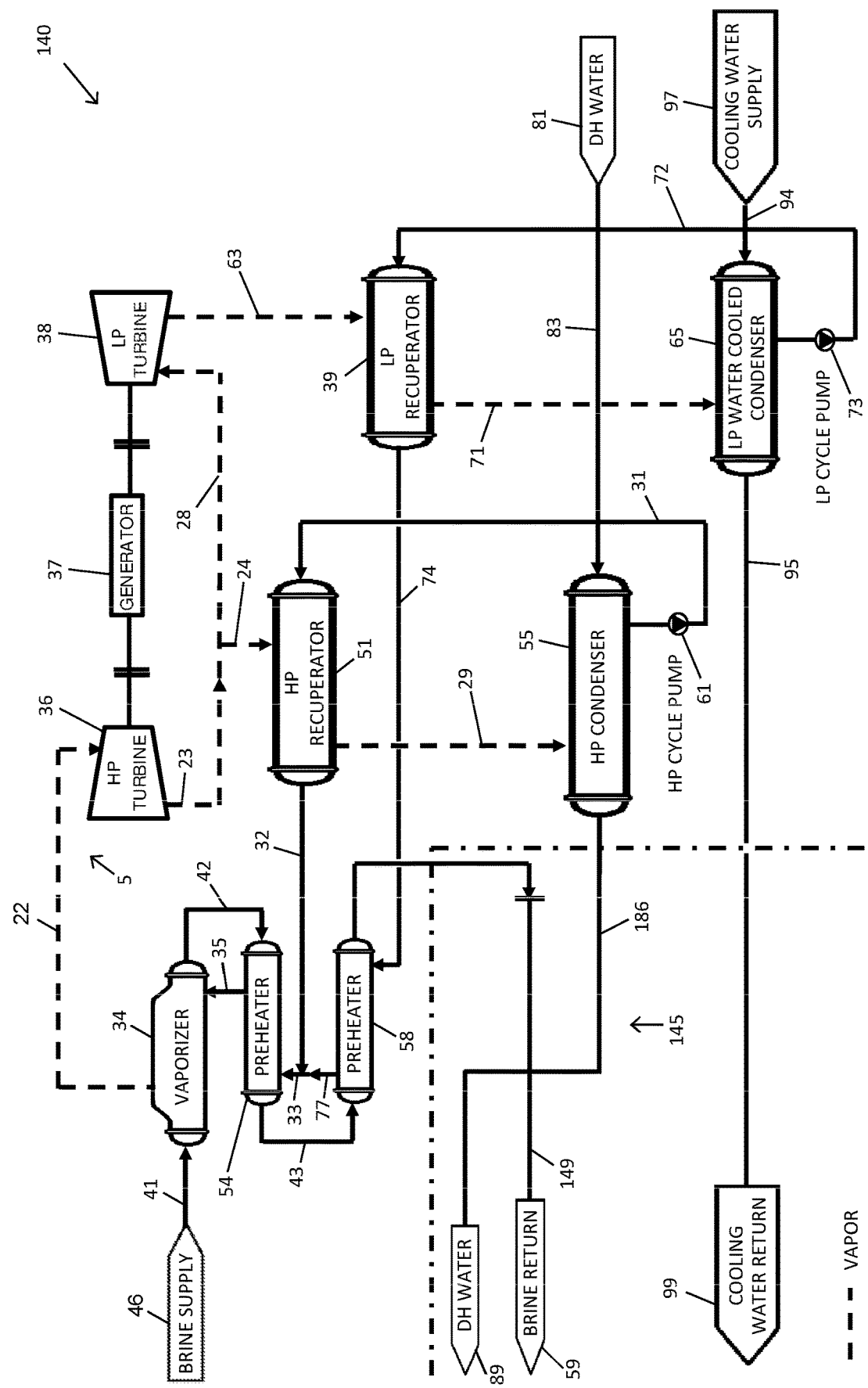

FIG. 4 is a schematic illustration of another embodiment of a geothermal cogeneration system.

DETAILED DESCRIPTION OF THE INVENTION

A fluid medium flowable through a district heating (DH) system to, and meeting the heat demands of, a heat consumer (hereinafter a "DH-usable fluid") is sufficiently heated, directly or indirectly, by means of a geothermal resource to obviate the need of supplementary heat influx with fossil fuel derived heat, such as waste heat, as has been practiced heretofore. The carbon dioxide emissions resulting from the combustion of the fossil fuels are therefore dramatically reduced, or completely eliminated.

The geothermal district heating system is rendered economically viable by utilizing a geothermal resource heat-depleted by a geothermal cogeneration system with a sufficiently high enthalpy level to transfer heat to the DH-usable fluid. The geothermal resource is thus influential in both generating electricity at the power-producing section and in producing heat at the heat-producing section, of the cogeneration system.

Figure 1:
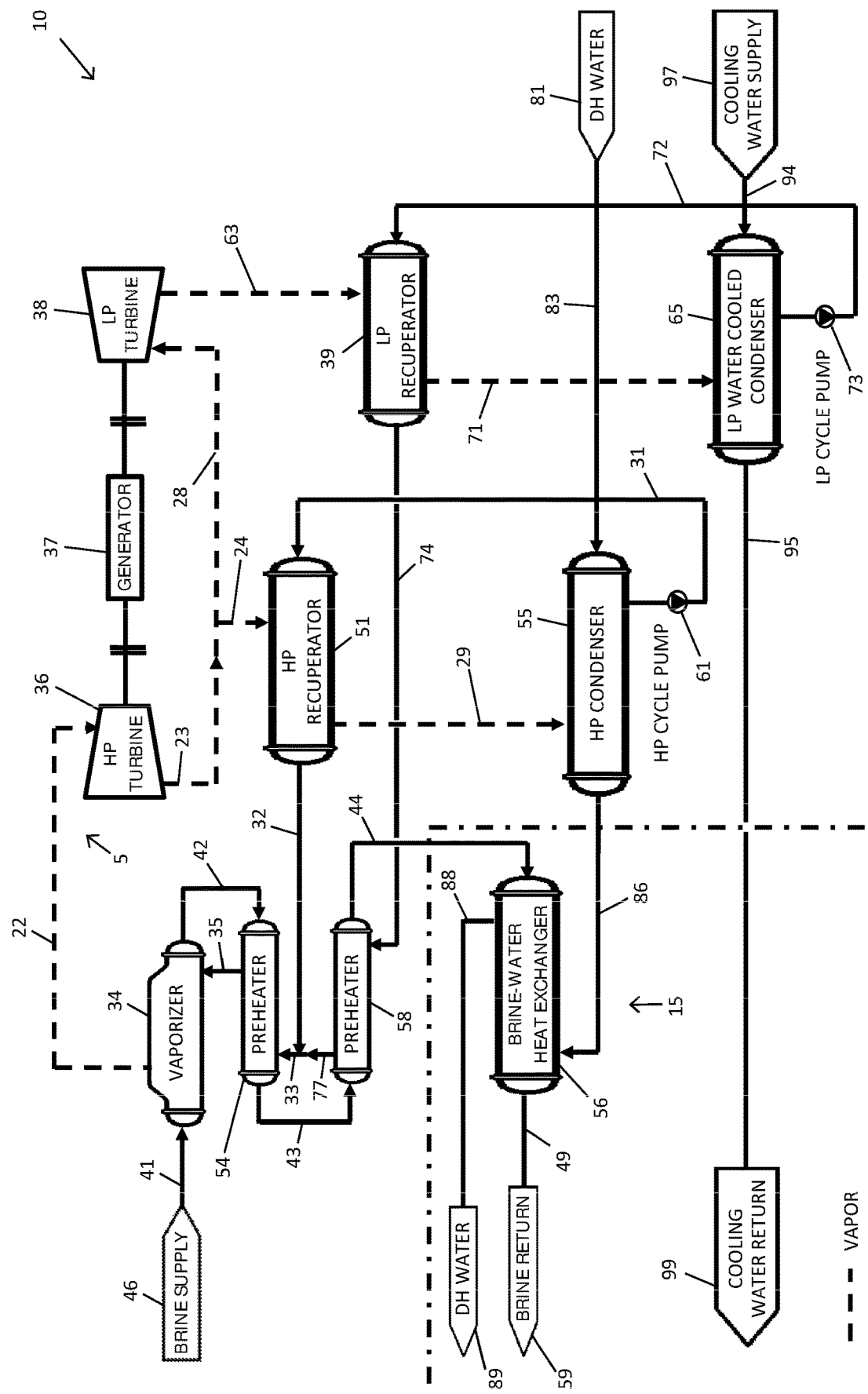
FIG. 1 is a schematic illustration of an embodiment of a geothermal cogeneration system.

FIG. 1 illustrates an embodiment of a geothermal cogeneration system, indicated generally by numeral 10. Geothermal cogeneration system 10 comprises power-producing section 5 and heat-producing section 15, the latter being indicated by a dashed-dotted line.

The following four types of fluids circulate in geothermal cogeneration system 10: (1) an organic motive fluid circulating in an Organic Rankine Cycle (ORC) of the power-producing section for each of a high pressure (HP) and low pressure (LP) turbine; (2) a geothermal fluid, generally brine, primarily for vaporizing the organic motive fluid; (3) district heating (DH) water heated by both the organic and geothermal fluids, for use in the heat-producing section, and (4) cooling medium, generally water, for condensing at least a portion of the organic motive fluid.

Geothermal brine with a relatively high enthalpy level is used in both power-producing section 5 and heat-producing section 15. The geothermal brine pumped from production well 46 flows via conduit 41 to vaporizer 34. The inventors have found that a brine temperature of at least 130° C. at production well 46 is sufficient to facilitate cost effective operation of geothermal cogeneration system 10 with a relatively high power output at the power-producing section and a relatively high heat influx at the heat-producing section.

After vaporizing the organic motive fluid which vapor is represented by dashed lines, the brine exits vaporizer 34 via conduit 42 to second-stage preheater 54. The heat depleted brine exiting second-stage preheater 54 flows to the first stage preheater 58 via conduit 43, and then to brine-water heat exchanger 56 via conduit 44. The heat depleted brine exiting brine-water heat exchanger 56 is delivered to injection well 59 via conduit 49.

In power-producing section 5, vaporized motive fluid flows via conduit 22 from vaporizer 34 to HP organic turbine 36, in which it is expanded to produce power and to generate electricity by generator 37 coupled with both HP organic turbine 36 and LP organic turbine 38. The expanded motive fluid is discharged from HP organic turbine 36 via conduit 23, and branches via conduit 24 to HP recuperator 51 in order to provide heat influx to the condensate produced by HP condenser 55 and also via conduit 28 to LP organic turbine 38. The motive fluid exiting HP recuperator 51 flows via conduit 29 to HP condenser 55, from which it is delivered as condensate by HP cycle pump 61 to HP recuperator 51 via conduit 31. The recuperated condensate flows via conduits 32 and 33 to second-stage preheater 54, and then to vaporizer 34 via conduit 35.

Some of the vaporized motive fluid discharged by HP organic turbine 36 is expanded by LP organic turbine 38 to produce power and to generate electricity by generator 37 coupled therewith. The expanded motive fluid is discharged from LP turbine 38 via conduit 63 to LP recuperator 39 in order to provide heat influx to the condensate produced by LP condenser 65. The motive fluid exiting LP recuperator 39 flows via conduit 71 to LP condenser 65, from which it is delivered as condensate by LP cycle pump 73 to LP recuperator 39 via conduit 72. The recuperated condensate flows via conduit 74 to first-stage preheater 58, and then to second stage preheater 54 via conduit 77, which combines with conduit 33.

DH water introduced via port 81 flows via conduit 83 to HP condenser 55, and serves to condense the motive fluid exiting HP recuperator 51 while being simultaneously heated. The DH water, after flowing through conduit 86 extending between HP condenser 55 and brine-water heat exchanger 56, is additionally heated by the heat depleted brine and flows via conduit 88 to outlet port 89 leading to the district heating system. A DH water temperature of approximately 60° C. at port 81 is considered sufficient to provide DH-usable fluid at the district heating system.

Cooling water for condensing the motive fluid exiting LP recuperator 39 flows via conduit 94 from cooling water supply port 97 to LP condenser 65, from which the heated water exits via conduit 95 to cooling water return port 99.

Alternatively, the cooling medium for LP condenser 65 may be air. If so desired, LP condenser 65 may be a plate heat exchanger, with the cooling medium being air or a liquid, such as water.

The DH water, functioning as the DH-usable fluid, is thus heated in two stages. In the first stage, the DH water is heated by the organic motive fluid flowing through HP condenser 55, which functions as an organic fluid-water heat exchanger. In the second stage, the DH water is additionally heated by the geothermal fluid flowing in brine-water heat exchanger 56. The twice heated DH water may be directly delivered to a heat consumer via a conduit of the district heating system, or, alternatively, may be indirectly delivered to a heat consumer.

The Applicant is unaware of a geothermal district heating system that comprises both an organic fluid-water heat exchanger and a brine-water heat exchanger, or even of a geothermal district heating system that comprises only an organic fluid water heat exchanger. This combination of heat exchangers helps to increase the thermal efficiency of the geothermal cogeneration system, while producing a surprisingly high level of electrical power together with a high DH water temperature.

The various components of geothermal cogeneration system 10 are operated in accordance with the given inlet brine temperature and inlet DH-usable fluid temperature in order to optimize the power output and heat influx to the DH usable fluid. For example, when the temperature of the brine is 192° C. at the production well prior to being introduced to the vaporizer, 158.3° C. at the inlet of the second-stage preheater after exiting the vaporizer, and 117.2° C. after exiting the first-stage preheater prior to being reinjected to the injection well, and the DH water temperature is 60° C. at the geothermal cogeneration system inlet port and 87° C. at the geothermal cogeneration system outlet port and the DH water has a mass flow rate of 900 kg/s, about 14 MW of electricity can be produced.

If the inlet brine temperature is significantly greater than 192° C., more power may be produced at power-producing section 5 while ensuring that a similar level of heat is produced at heat-producing section 15.

Figure 2:
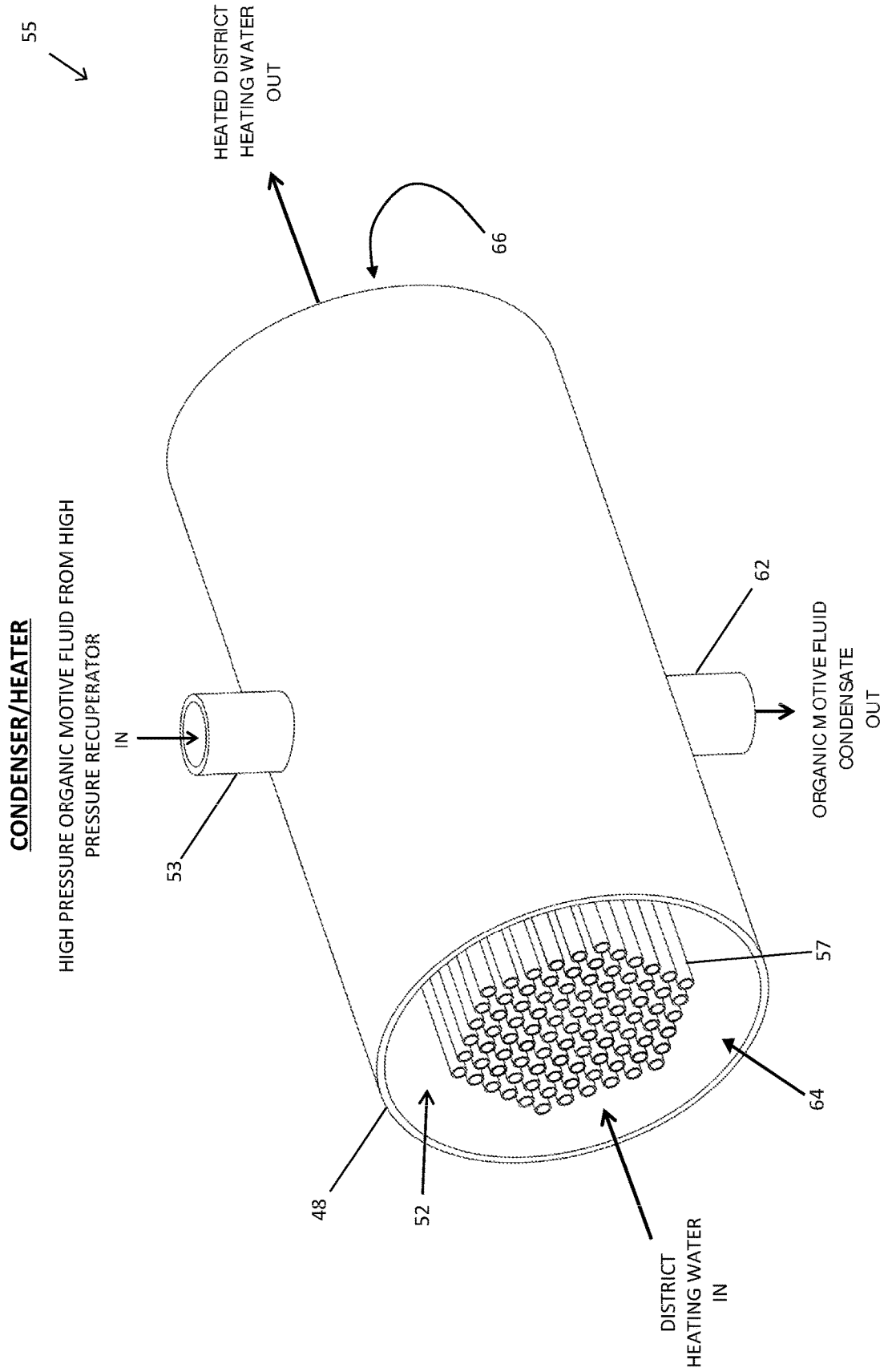
FIG. 2 is a schematic illustration in perspective view of a heat exchanger used in conjunction with the cogeneration system of FIG. 1.

As shown in FIG. 2, HP condenser 55 is a shell and tube heat exchanger wherein the organic motive fluid vapor from the high pressure recuperator flows via inlet port 53 throughout the interior 52 of shell 48 in the shell side and exits via outlet port 62, while the DH water flows in the tube side within tubes 57 from inlet side 64 to outlet side 66. This arrangement permits the organic motive fluid vapor exiting the HP recuperator to condense on the external surface of tubes 57 as the DH water absorbs the latent heat of condensation released by the organic motive fluid and becomes heated.

In addition to heating the DH water, HP condenser 55 helps to increase the thermal efficiency of the geothermal cogeneration system by supplying the HP recuperator with the organic motive fluid condensate. The enthalpy of the recuperated organic motive fluid steadily increases after flowing through the second-stage preheater and vaporizer.

Likewise, brine-water heat exchanger 56 (FIG. 1), through which the heated DH water exiting HP condenser 55 from outlet side 66 flows to become additionally heated, may be a shell and tube heat exchanger. Heat depleted brine exiting first stage preheater 58 may flow through the tubes while the DH water may flow in the shell side.

Alternatively, brine may flow in the shell side and DH water may flow through the tubes. In a further option, brine-water heat exchanger 56 may be a plate-type heat exchanger.

Figure 3:
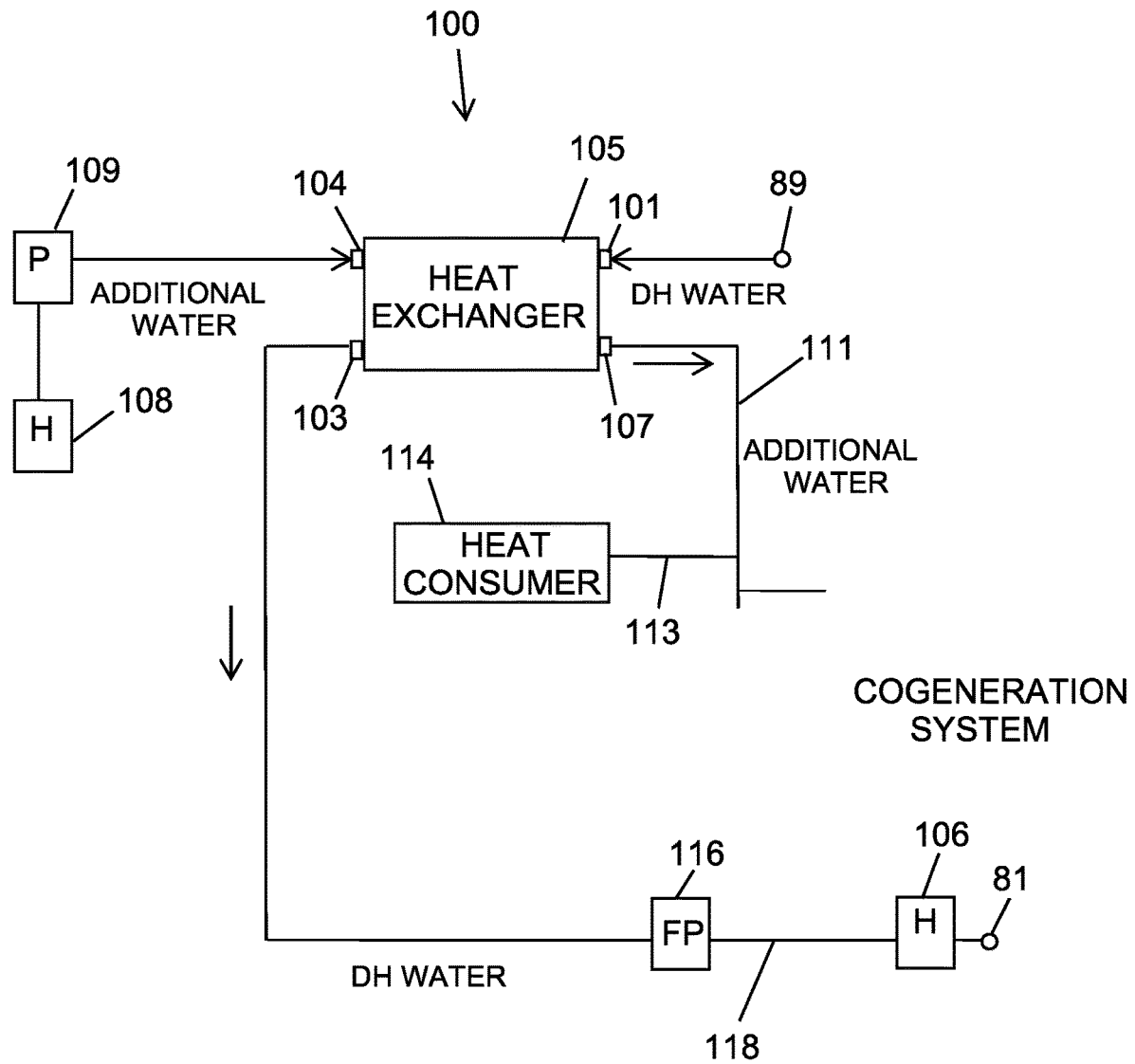
FIG. 3 is a schematic illustration of an embodiment of a district heating system.

In another embodiment as shown in FIG. 3, district heating system 100 comprises a water-water heat exchanger 105, generally of the shell and tube, but which also may be a plate type heat exchanger. A first inlet port 101 of heat exchanger 105 is fed with heated DH water exiting outlet port 89 of the geothermal cogeneration system. This heated DH water is brought in heat exchanger relation with an additional water supply, generally water, introduced to a second inlet port 104 of heat exchanger 105, and is then discharged through a first outlet port 103. The additional water supply is generally, however not necessarily, maintained at a lower temperature than the heated DH water, for example by means of a heater 108, such that when brought in exchanger relation with the heated DH water, the additional water supply discharged from a second outlet port 107 is ensured of having a heat consumer usable temperature of approximately 60-75° C. The flow rate of the additional water supply is generally controlled by a pump 109 so as to be substantially equal to the flow rate of heated DH water flowing within heat exchanger 105. Alternatively, the flow rate of the additional water supply may be substantially different than the flow rate of heated DH water flowing within heat exchanger 105 in order to comply with various thermodynamic considerations. The discharged additional water supply flows via second outlet port 107 to main DH conduit 111, and then branches in parallel to a plurality of secondary conduits 113, each of which providing the heat demands of a corresponding heat consumer 114. The DH water discharged from first outlet port 103 may be recirculated by means of feed pump 116 and subsequently delivered via conduit 118 to port 81 of the geothermal cogeneration system, in order to be reheated for additional use in district heating system 100. Alternatively, the DH water discharged from first outlet port 103 may flow into a body of water, such as a pond, river or reservoir, and the DH water may be introduced to port 81 from this body of water, and optionally may be heated by heater 106.

The use of water-water heat exchanger 105 advantageously provides DH usable fluid of a sufficiently high heat consumer usable temperature of at least 60° C. at district heating system 100, while helping the heat consumers to avoid direct contact with liquid, such as for bathing purposes, which may have become contaminated after having been brought in heat exchanger relation with brine at the HP condenser, even if the risk of contamination is very low. Thus there is no need to provide a special structure for either the organic fluid-water heat exchanger or the brine-water heat exchanger, or for precautions to be taken to prevent contamination of the liquid flowing through these heat exchangers.

FIG. 4 illustrates another embodiment of a geothermal cogeneration system, indicated generally by numeral 140. Geothermal cogeneration system 140 is adapted for use of lower temperature brine, and is identical to cogeneration system 10 of FIG. 1, but is provided without the brine-water heat exchanger. The heat depleted brine exiting first stage preheater 58 is reinjected to injection well 59 via conduit 149.

In heat-producing section 145, DH water introduced via port 81 is heated by the organic motive fluid being condensed in HP recuperator 51. The heated DH water flows through conduit 186 extending from HP condenser 55 to outlet port 89 leading to the district heating system, and has a water temperature that is sufficient to provide DH-usable fluid at the district heating system. If desired, the heated DH water may be delivered to water-water heat exchanger and brought in heat exchanger relation with an additional water supply.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. A geothermal district heating (DH) system, comprising:
   a) a plurality of DH conduits, each of said conduits extending to a corresponding heat consumer;
   b) a fluid circuit through which a geothermal fluid is flowable;
   c) at least two heat exchangers, each of said heat exchangers configured to transfer heat directly or indirectly from said geothermal fluid to a first supply of DH-usable water and to a second supply of additional DH-usable water with a total heat influx provided by said at least two heat exchangers to said DH-usable water and to said additional DH-usable water that is sufficiently high to raise a temperature of said DH-usable water and said additional DH-usable water to a predetermined DH-usable temperature without need for any supplemental fossil fuel derived waste heat to be transferred to said DH-usable water and said additional DH-usable water,
   wherein a first of the at least two heat exchangers is a vaporizer for vaporizing an organic motive fluid circulating in an Organic Rankine Cycle (ORC) type power plant,
   wherein a second of the at least two heat exchangers is a heat exchanger by which said organic motive fluid at a temperature less than its temperature upon exiting said vaporizer transfers heat to said DH-usable water,
   wherein a third of the at least two heat exchangers is a water-water heat exchanger by which said DH-usable water at a temperature greater than its temperature prior to being received in said second heat exchanger transfers heat to said additional DH-usable water; and
   d) means for delivering said additional DH-usable water through said plurality of DH conduits.

2. The system according to claim 1, wherein a fourth of the at least two heat exchangers is a heat exchanger by which heat depleted geothermal fluid transfers heat to, and raises the temperature of the DH-usable water exiting the second heat exchanger.

3. The system according to claim 2, wherein the DH-usable water exiting the fourth heat exchanger transfers heat to the additional DH-usable water.

4. A geothermal cogeneration system, comprising:
   a) a fluid circuit through which a geothermal fluid is flowable;
   b) a power-producing section by which an organic motive fluid circulating in an Organic Rankine Cycle (ORC) is vaporized by the geothermal fluid, and is caused to expand in a turbine of the ORC to produce power; and
   c) a heat-producing section through which a liquid serially flows so as to be heated in a first heat exchanger by discharge of the organic turbine and is additionally heated in a second heat exchanger by heat depleted geothermal fluid.

5. The system according to claim 4, wherein the first heat exchanger is configured to condense the organic motive fluid.

6. The system according to claim 5, wherein the power-producing section further comprises a recuperator which is configured to receive the organic turbine discharge in a first port and the organic fluid condensate in a second port, and to discharge recuperated organic fluid heated by the organic turbine discharge via a third port so as to be in heat exchange relation with the geothermal fluid circuit and the heat depleted organic turbine discharge via a fourth port to the first heat exchanger.

7. The system according to claim 6, wherein the recuperated organic fluid discharged from the third port is additionally heated by heat depleted geothermal fluid being at a temperature greater than the temperature of the heat depleted geothermal fluid introduced to the second heat exchanger.

8. The system according to claim 4, wherein the power-producing section comprises a high-pressure organic turbine and a low-pressure organic turbine, and the liquid flowing in the heat-producing section is heated in the first heat exchanger by discharge of the high-pressure turbine.

9. The system according to claim 8, wherein the power-producing section further comprises a low-pressure condenser for condensing the organic motive fluid discharged from the low-pressure organic turbine.

10. The system according to claim 9, wherein the power-producing section further comprises a low-pressure recuperator which is configured to receive the low-pressure organic turbine discharge in a first port and the low-pressure organic fluid condensate in a second port, and to discharge recuperated low-pressure organic fluid heated by the low-pressure organic turbine discharge via a third port so as to be in heat exchange relation the geothermal fluid circuit and the heat depleted low-pressure organic turbine discharge via a fourth port to the low-pressure condenser.

11. The system according to claim 10, wherein the recuperated low-pressure organic fluid discharged from the third port is additionally heated by heat depleted geothermal fluid being at a temperature greater than the temperature of the heat depleted geothermal fluid introduced to the second heat exchanger.

12. The system according to claim 4, wherein the heat depleted geothermal fluid exiting the second heat exchanger is reinjected into an injection well.

13. The system according to claim 4, wherein the heat-producing section is associated with a district heating (DH) system that comprises a plurality of DH conduits such that each of said conduits extends to a corresponding heat consumer.

14. The system according to claim 13, further comprising a third heat exchanger by which the liquid exiting the second heat exchanger transfers heat to an additional liquid, wherein the additional liquid is flowable through the plurality of DH conduits.

15. The system according to claim 14, wherein the additional liquid is heated to a sufficiently high heat consumer usable temperature of at least 60° C.

16. The system according to claim 14, further comprising a feed pump configured to recirculate heat depleted liquid exiting the third heat exchanger to an inlet port of the geothermal cogeneration system which is in liquid communication with the first heat exchanger, in order to be reheated for additional use in the district heating system.

17. The system according to claim 14, wherein both the liquid and the additional liquid is water and the third heat exchanger is a water-water heat exchanger.

18. The system according to claim 13, wherein a total heat influx provided by the first and second heat exchangers to the liquid flowing in the heat-producing section is sufficiently high to raise a temperature of the liquid to a predetermined DH-usable temperature without need for any supplemental fossil fuel derived waste heat to be transferred to the liquid.

19. The system according to claim 1, wherein the DH-usable water exiting the second heat exchanger transfers heat to the additional DH-usable fluid.

20. The system according to claim 7, further comprising a vaporizer to which the recuperated organic fluid that is additionally heated by the heat depleted geothermal fluid being at a temperature greater than the temperature of the heat depleted geothermal fluid introduced to the second heat exchanger is supplied and vaporized.

* * * * *